(12) United States Patent
Abe et al.

(10) Patent No.: US 8,179,965 B2
(45) Date of Patent: May 15, 2012

(54) MOVING PICTURE CODING METHOD

(75) Inventors: Kiyofumi Abe, Osaka (JP); Syouzou Fujii, Osaka (JP); Shinjiro Mizuno, Osaka (JP)

(73) Assignee: Panasonic Corporation, Osaka (JP)

( * ) Notice: Subject to any disclaimer, the term of this patent is extended or adjusted under 35 U.S.C. 154(b) by 387 days.

(21) Appl. No.: 12/531,750

(22) PCT Filed: Jan. 20, 2009

(86) PCT No.: PCT/JP2009/000173
§ 371 (c)(1),
(2), (4) Date: Sep. 17, 2009

(87) PCT Pub. No.: WO2009/093436
PCT Pub. Date: Jul. 30, 2009

(65) Prior Publication Data
US 2010/0104011 A1  Apr. 29, 2010

(30) Foreign Application Priority Data
Jan. 23, 2008 (JP) ................................. 2008-012993

(51) Int. Cl.
*H04N 11/02* (2006.01)
(52) U.S. Cl. ......... 375/240.12; 375/240.04; 375/240.13; 375/240.24; 348/395.1; 348/305
(58) Field of Classification Search ............. 375/240.03, 375/240.04, 240.12, 240.13, 240.14, 240.15, 375/240.16, 240.17, 240.18, 240.24; 348/395, 348/405
See application file for complete search history.

(56) References Cited

U.S. PATENT DOCUMENTS

| 5,237,410 | A | * | 8/1993 | Inoue ...................... 375/240.12 |
| 5,440,344 | A | * | 8/1995 | Asamura et al. .......... 375/240.04 |
| 6,125,201 | A | * | 9/2000 | Zador ........................... 382/166 |
| 6,205,286 | B1 | | 3/2001 | Nishimura et al. |
| 6,865,291 | B1 | * | 3/2005 | Zador ........................... 382/166 |
| 2006/0008038 | A1 | * | 1/2006 | Song et al. ..................... 375/350 |

(Continued)

FOREIGN PATENT DOCUMENTS
JP 7-107466 4/1995
(Continued)

OTHER PUBLICATIONS

Full English translation of JP 11-196423, Jul. 1999.
(Continued)

*Primary Examiner* — Ayaz Sheikh
*Assistant Examiner* — Andrew C Lee
(74) *Attorney, Agent, or Firm* — Wenderoth, Lind & Ponack, L.L.P.

(57) ABSTRACT

A moving picture coding method includes: determining a luminance change by determining whether it is possible that a luminance change equal to or greater than a predetermined amount has occurred between the reference coded picture and a current picture; determining a flat region by determining whether a degree of non-uniformity in pixel values in a current block is smaller than a predetermined threshold; and determining a quantization width wherein, when it has been determined that it is possible that the luminance change equal to or greater than the predetermined amount has occurred and that the degree of non-uniformity is smaller than the predetermined threshold, a quantization width is determined to be smaller than a quantization width when it has not been determined to be possible that the luminance change equal to or greater than the predetermined amount has occurred or that the non-uniformity degree is smaller than the predetermined threshold.

16 Claims, 14 Drawing Sheets

U.S. PATENT DOCUMENTS

2007/0211803 A1 9/2007 Oishi
2010/0074518 A1* 3/2010 Tanizawa et al. ............. 382/166

FOREIGN PATENT DOCUMENTS

| JP | 11-196423 | 7/1999 |
|----|-----------|--------|
| JP | 2006-203597 | 8/2006 |
| JP | 2007-274671 | 10/2007 |

OTHER PUBLICATIONS

Full English translation of JP 2006-203597, Aug. 2006.
International Search Report issued Mar. 3, 2009 in International (PCT) Application No. PCT/JP2009/000173.

* cited by examiner (b)

| Camera control information | EV (exposure value) |
| | Zoom position |
| | Shutter speed |
| | Aperture value |
| | Gain value |

| | Flat region block | | | | Non-flat region block | | | |
|---|---|---|---|---|---|---|---|---|
| | 0 | 1 | 2 | 3 | 0 | 1 | 2 | 3 |
| Prediction residual coefficient | | | | | | | | |
| 0 | 3 | 3 | 3 | 3 | 10 | 16 | 9 | 2 |
| 1 | 3 | 3 | 3 | 3 | 12 | 3 | 14 | 11 |
| 2 | 3 | 3 | 3 | 2 | 10 | 8 | 7 | 32 |
| 3 | 2 | 2 | 2 | 2 | 27 | 21 | 16 | 18 |
| Orthogonal transformation coefficient | | | | | | | | |
| 0 | 10 | 0 | 0 | 0 | 32 | 18 | 8 | 3 |
| 1 | 1 | 0 | 0 | 0 | 8 | 16 | 2 | 0 |
| 2 | 0 | 0 | 0 | 0 | 4 | 1 | 3 | 0 |
| 3 | 0 | 0 | 0 | 0 | 3 | 2 | 0 | 0 |

(a)

(b)

MOVING PICTURE CODING METHOD

TECHNICAL FIELD

The present invention relates to moving picture coding methods and moving picture coding apparatuses, and in particular to a technique for preventing coding noise which occurs when performing inter picture prediction.

BACKGROUND ART

When coding moving pictures, the amount of information is compressed generally by reducing redundancy in temporal and spatial directions. In inter picture predictive coding for reducing temporal redundancy, for example, motion estimation is performed and a prediction picture is created on a block-by-block basis by referring to a preceding or a following picture. Then, a difference value between the created prediction picture and a current picture to be coded is coded.

Here, a "picture" is a term representing a single picture plane, and refers to a frame in a progressive image and to a frame or a field in an interlaced image.

The interlaced image is an image where a single frame includes two fields each provided at a different time. In coding the interlaced image, a single frame can be processed as a frame, as two fields, and as a frame structure or a field structure depending on each block in the frame.

A picture obtained not through inter picture predictive coding, but through intra picture predictive coding is called an I picture. Further, a picture obtained through inter picture predictive coding where only a single picture is referred to is called a P picture. Furthermore, a picture obtained through inter picture predictive coding where two or less pictures can be concurrently referred to is called a B picture.

It is to be noted that a reference picture needs to be coded and stored in a memory prior to a current picture to be coded, and is selected and specified appropriately for each block that is a base unit for coding.

The P picture or the B picture is coded through motion-compensation inter-picture predictive coding. The motion-compensation inter-picture predictive coding is a coding method that detects the amount of motion (motion vector) of each portion in a picture and performs a prediction in consideration of the amount of motion, thereby improving prediction accuracy and reducing data amount.

More specifically, in the motion-compensation inter-picture predictive coding, the motion vector is detected by finding, in a reference picture, a position of a block having pixel information that is the most similar to a current block to be coded of a current picture to be coded.

Further, only a difference (prediction residual) between a pixel value of the block at the position in the reference picture and a pixel value of the current block to be coded is coded. In the motion-compensation inter-picture predictive coding, the amount of data is reduced in a manner described above.

Accordingly, when a block more similar to the current block to be coded can be detected, the prediction residual becomes smaller, and thus high compression rate can be achieved.

Conversely, when a similar block cannot be detected, the amount of information necessary for coding the prediction residual increases. Therefore, under such a circumstance that enough coding amount cannot be allocated to the prediction residual due to a low bit rate, the prediction residual cannot be reproduced sufficiently, resulting in a distortion which causes deterioration in image quality as coding noise.

The coding noise is noticeable in a region where non-uniformity between pixel values is relatively small (hereinafter referred to as "flat region"). Taking the above into consideration, there is a technique (the first prior art) which detects the flat region in a current picture to be coded and sets a quantization width as a relatively small value in the flat region, thereby preventing coding noise from occurring in the flat region.

Further, in the case where a luminance change is relatively great between the current picture to be coded and the reference picture, it is difficult to detect a block similar to the current block to be coded in the reference picture. More specifically, a great luminance change in a current moving picture to be coded is one of the factors to increase prediction residual and one of the causes for coding noise occurrence.

FIG. 14 is a schematic view which is an example of a situation where prediction residual becomes great and explains the behavior of conventional motion compensation when a luminance change has occurred.

In FIG. 14, P3-Org is a current picture to be coded and P1-Ref and P2-Ref are reference pictures.

The example as illustrated in FIG. 14 shows that luminance changes as time advances. More specifically, the luminance gradually increases in order of P1-Ref, P2-Ref and P3-Org.

In such a case, the prediction residual becomes great from wherever a prediction is made. For example, a case is assumed in which a current block to be coded BL01 is predicted from a position of BL21, a current block to be coded BL02 is predicted from a position of BL12, and P3-Pred is created as a result.

In this case, since the pixel values greatly differ between blocks on which motion compensation has been performed, the pixel values of BL01 and BL02 are greatly different from the pixel values of respective corresponding blocks in P3-Pred that is the prediction picture. This increases the prediction residual of each block in P3-Org, and as a result, leads to a situation where coding noise is likely to occur.

In order to address such problems, Japanese Unexamined Patent Application Publication No. 2007-274671, for example, discloses a method of detecting a block affected by the luminance change in a picture and increasing a coding amount allocated to the block (the second prior art).

However, with the above-described first prior art, when pictures continue each of which includes a large proportion of flat regions, for example, the number of blocks for which the coding amount should be increased significantly increases.

As a result, the necessary coding amount in total increases, leading to a problem that sufficient compression efficiency cannot be obtained.

Further, with the above-described second prior art, when the luminance change occurs intensively in a limited area, it is possible to identify an object region and increase an image quality only in the region.

However, when the luminance change occurs in the entire picture plane or gradually over several frames, the number of blocks for which the coding amount should be increased significantly increases.

As a result, the necessary coding amount in total increases, leading to a problem that sufficient compression efficiency cannot be obtained, as in the above-described first prior art.

For example, a moving picture captured by a video camera has a characteristic that a luminance in the entire picture plane changes depending on a positional relation between a light source and a subject photographed by the camera. This causes frequent luminance changes in the entire picture plane when the camera or the subject photographed moves, the brightness of the light source changes, and the like.

SUMMARY OF THE INVENTION

The present invention takes the above-described conventional problems into consideration, and aims to provide a moving picture coding method which, when a moving picture to be coded includes a temporal luminance change, minimizes an increase in a coding amount and effectively prevents coding noise.

In order to achieve the object described above, a moving picture coding method according to the present invention is a moving picture coding method for coding a moving picture by performing predictive coding with reference to a temporally preceding or following coded picture on a block-by-block basis, the method including: determining a luminance change, in which it is determined whether or not there is a possibility that a luminance change equal to or greater than a predetermined amount has occurred between the coded picture used for the reference and a current picture to be coded including a current block to be coded that is a block on which the predictive coding is performed; determining a flat region, in which it is determined whether or not a degree of non-uniformity in pixel values of pixels is smaller than a predetermined threshold, the pixels being included in the current block to be coded; and determining a quantization width used for quantization in coding the current block to be coded, wherein, in the determining the quantization width, when it has been determined (i) in the determining the luminance change, that there is the possibility that the luminance change equal to or greater than the predetermined amount has occurred, and (ii) in the determining the flat region, that the degree of non-uniformity is smaller than the predetermined threshold, a quantization width is determined to be a smaller value than a quantization width when it has not been determined: that there is the possibility that the luminance change equal to or greater than the predetermined amount has occurred; or that the degree of non-uniformity is smaller than the predetermined threshold.

The above configuration makes it possible, when a moving picture to be coded includes a temporal luminance change, to improve an image quality in a flat region where degradation of the image quality is noticeable.

Further, the flat region is a region which can be coded with a small coding amount. Therefore, an increase in the coding amount caused by preventing the coding noise in the flat region hardly affects the total coding amount.

More specifically, with the moving picture coding method of the present invention, it is possible to prevent coding noise from occurring only in a region in which the coding noise is noticeable and which hardly affects an increase in the coding amount.

As described above, the present invention can prevent the coding noise effectively while minimizing an increase in a coding amount.

Further, in the determining the luminance change, it may be determined that there is the possibility that the luminance change equal to or greater than the predetermined amount has occurred, when an amount of change in a value indicated by camera control information obtained from a camera that generates a moving picture to be coded is equal to or greater than a threshold for camera control information.

The above configuration makes it possible to detect the luminance change with high accuracy without performing a high-load processing to analyze an image to detect the luminance change.

Further, a moving picture coding method according to the present invention is a moving picture coding method for coding a moving picture by performing predictive coding with reference to a temporally preceding or following coded picture on a block-by-block basis, the method including: determining a coding structure, in which whether or not a coding structure for a current picture to be coded is a P-picture, the current picture to be coded including a current block to be coded on which the predictive coding is performed; determining a flat region, in which it is determined whether or not a degree of non-uniformity in pixel values of pixels is smaller than a predetermined threshold, the pixels being included in the current block to be coded; and determining a quantization width used for quantization in coding the current block to be coded, wherein, in the determining the quantization width, when it has been determined (i) in the determining the coding structure, that the coding structure is the P-picture, and (ii) in the determining the flat region, that the degree of non-uniformity is smaller than the predetermined threshold, a quantization width may be determined to be a smaller value than a quantization width when it has not been determined: that the coding structure is the P-picture; or that the degree of non-uniformity is smaller than the predetermined threshold.

This processing can also minimize an increase in the coding amount and effectively prevent coding noise.

It is to be noted that the present invention can be embodied not only as one of the moving picture coding methods described above, but also as a moving picture coding apparatus and an integrated circuit which include elements that perform respective processes included in the moving picture coding method of the present invention, and as a program which causes a computer to execute each of the steps included in the moving picture coding method of the present invention.

Further, such a program can be widely distributed via a recording medium such as a DVD and a transmission medium such as the Internet.

The present invention can provide a moving picture coding method that minimizes an increase in a coding amount and effectively prevents coding noise.

More specifically, according to the moving picture coding method of the present invention, an image quality is improved in a region where: degradation of the image quality is noticeable; and increase in the coding amount accompanied by an improvement of the image quality is small. This makes it possible to improve an image quality which is visible to human eyes and, at the same time, to prevent an increase in the coding amount.

BRIEF DESCRIPTION OF DRAWINGS

FIG. 4 is a schematic view for explaining a difference of tendency of an amount of codes generated by coding between the flat region and the non-flat region.

DETAILED DESCRIPTION OF THE INVENTION

Embodiments according to the present invention will be described below with reference to the drawings.

First Embodiment

Figure 1:
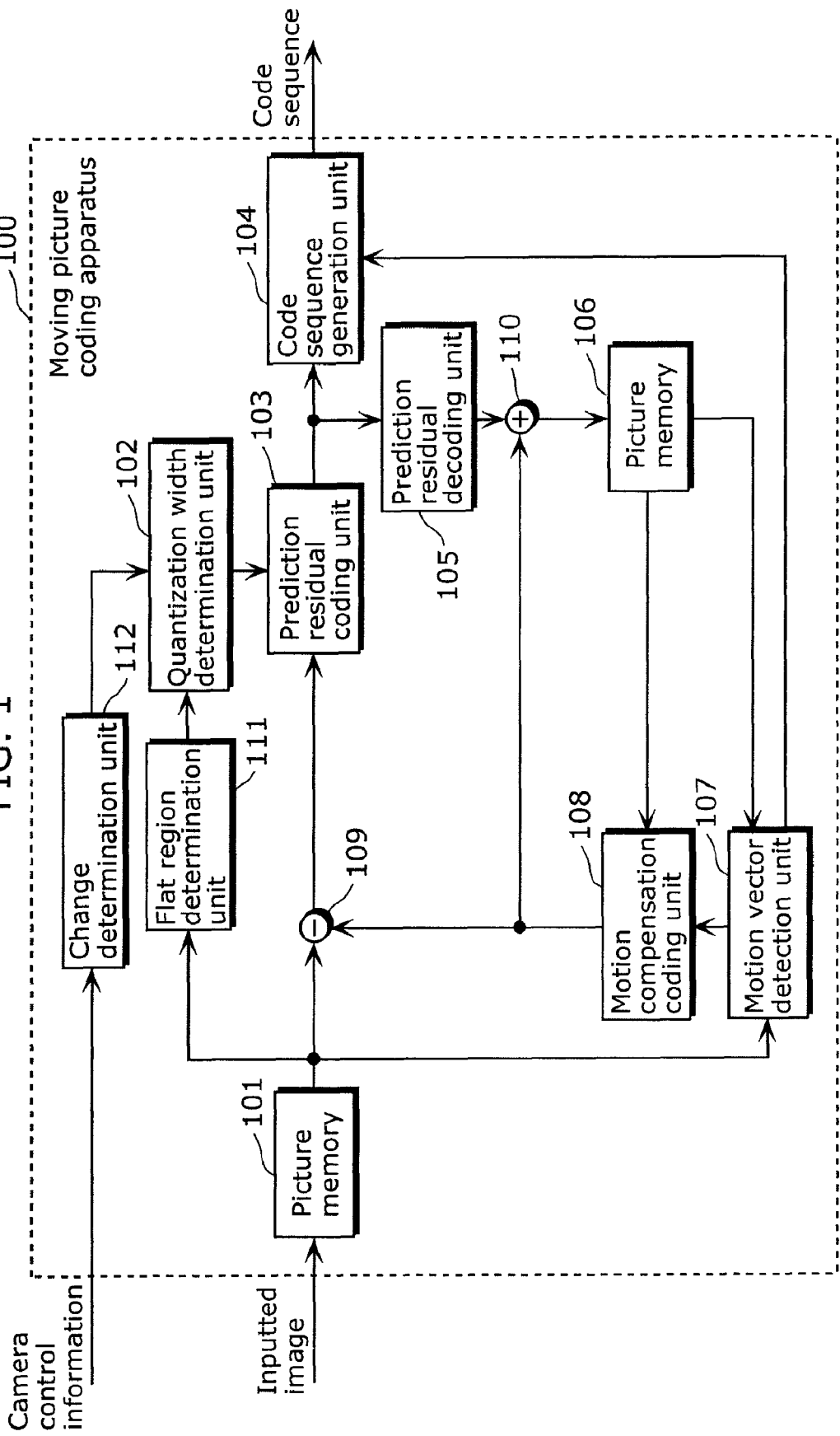
FIG. 1 is a block diagram which shows a major functional configuration of a moving picture coding apparatus according to a first embodiment of the present invention.

FIG. 1 is a block diagram which shows a major functional configuration of a moving picture coding apparatus 100 according to a first embodiment of the present invention.

The moving picture coding apparatus 100 includes: a picture memory 101, a quantization width determination unit 102, a prediction residual coding unit 103, a code sequence generation unit 104, a prediction residual decoding unit 105, a picture memory 106, a motion vector detection unit 107, a motion compensation coding unit 108, a flat region determination unit 111, and a change determination unit 112, as shown in FIG. 1.

A moving picture to be coded is inputted into the picture memory 101 on a per picture basis in an order of display, and the pictures are sorted in order of coding to be performed.

Further, each of the pictures are divided into blocks called macroblocks and subsequent processes are performed on a block-by-block basis. The macroblock is a block including horizontal 16×vertical 16 pixels, for example.

An inputted image signal on a macroblock basis is read from the picture memory 101 and inputted into a difference calculation unit 109.

The difference calculation unit 109 outputs, to the prediction residual coding unit 103, a difference image signal obtained by calculating the difference between the inputted image signal and a prediction picture signal outputted from the motion compensation coding unit 108.

The prediction residual coding unit 103 performs orthogonal transformation on the difference image signal, further performs quantization using a quantization width determined in the quantization width determination unit 102, and outputs a residual coding signal.

The residual coding signal is inputted into the prediction residual decoding unit 105 and performed inverse quantization and inverse orthogonal transformation, and then a residual decoding signal is outputted from the prediction residual decoding unit 105.

An addition operation unit 110 adds the residual decoding signal to the prediction picture signal, so that reconstructed image signal is generated.

Further, among the generated reconstructed image signals, a signal which is likely to be referred to in subsequent inter picture prediction is stored in the picture memory 106. More specifically, a picture which is likely to be referred to in a coding process performed by the motion compensation coding unit 108 is stored in the picture memory 106.

Meanwhile, the inputted image signal on a macroblock basis, which is read from the picture memory 101, is inputted also into the motion vector detection unit 107.

The motion vector detection unit 107 searches a reference picture including the reconstructed image signal stored in the picture memory 106, and detects an image region most similar to the inputted image signal, thereby determining a motion vector that indicates a position of the image region.

Further, according to the H.264, it is possible to use plural pictures as reference pictures, for example. Therefore, a reference index for specifying a picture to be used as the reference picture is determined at the same time.

The motion compensation coding unit 108 generates a prediction picture from the reference picture stored in the picture memory 106 by using the motion vector and the reference index which have been detected in the above-described processes.

Coded information, such as the residual coding signal, the motion vector, and the reference index which have been generated in a series of processes, is inputted into the code sequence generation unit 104. The code sequence generation unit 104 generates a code sequence to be outputted from the moving picture coding apparatus 100, by performing variable length coding on the coded information which has been inputted.

Next, processes performed by the change determination unit 112, the flat region determination unit 111, and the quantization width determination unit 102 for determining a value of the quantization width to be used when the prediction residual coding unit 103 performs quantization will be described in detail.

The flat region determination unit 111 determines whether or not a macroblock currently to be coded (hereinafter referred to as "current block to be coded") is a flat region. The change determination unit 112 determines whether or not an amount of change of camera control information is great, which has been inputted from a camera that generates a moving picture inputted into the moving picture coding apparatus 100.

Each result of the determinations is inputted into the quantization width determination unit 102. The quantization width determination unit 102 determines the quantization width by using the determination results, and inputs the determined quantization width into the prediction residual coding unit 103.

It is to be noted that the change determination unit 112 is the first example of a processing unit that performs a luminance change determination step in a moving picture coding method of the present invention.

Processing flow described above is summarized in a flowchart of FIG. 2(a).

Figure 2:
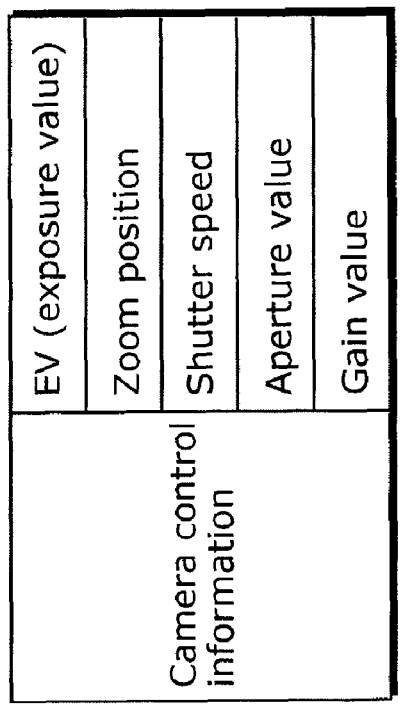
FIG. 2(a) is a flow chart which shows a processing flow of determining a quantization width in the moving picture coding apparatus according to the first embodiment.
FIG. 2(b) is a diagram which shows an example of camera control information related to a luminance change.
Figure 2:
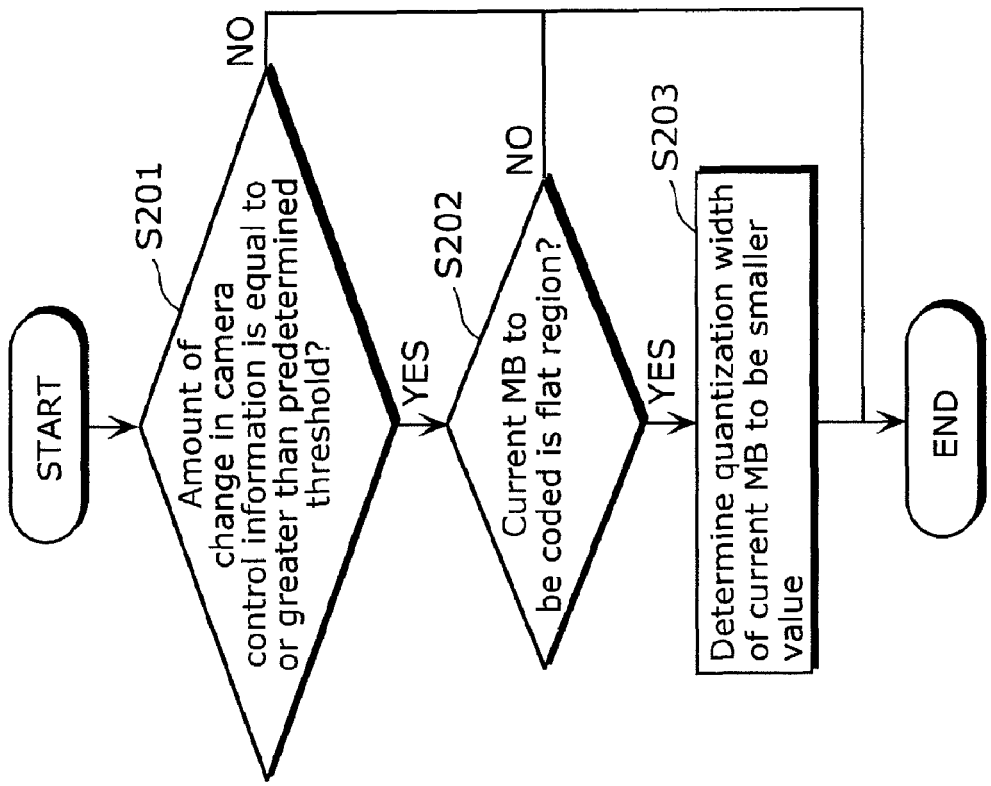

FIG. 2(a) is a flowchart which shows a processing flow of determining a quantization width of the moving picture coding apparatus 100 according to the first embodiment.

The change determination unit 112 determines whether or not the amount of change in the camera control information is equal to or greater than a predetermined threshold (S201).

The change determination unit 112 uses specifically, for the determination, camera control information related to a temporal luminance change in a moving picture currently to be coded. An example of camera control information used for the determination is shown in FIG. 2(b).

FIG. 2(b) is an example of camera control information related to a luminance change.

The change determination unit 112 performs the above-described determination by using at least one of an exposure value (EV), a zoom position, a shutter speed, an aperture value, and a gain value, as shown in FIG. 2(b).

For example, in the case where an absolute value of increased or decreased amount of the EV during a predetermined period is equal to or greater than a predetermined threshold, it can be determined that a luminance change equal to or greater than a predetermined amount has occurred between the current picture to be coded and the reference picture, or there is a possibility of the occurrence.

It is to be noted that the above-mentioned "predetermined period" is a period specified according to, for example, a time, the number of pictures, or the like.

The change determination unit 112 compares the amount of change of the camera control information and the predetermined threshold, as described above. With this, it is determined whether or not a luminance change of equal to or greater than the predetermined amount has occurred between the current picture to be coded and the reference picture that has been obtained from previous coding.

Further, the change determination unit 112, in the case where the amount of change of the camera control information is greater than the predetermined threshold (YES in S201), notifies the quantization width determination unit 102 accordingly.

Next, the flat region determination unit 111 determines whether or not the current block to be coded is a flat region (S202). It is to be noted that this determination may be performed prior to or in parallel with the determination regarding luminance change (S201).

The flat region determination unit 111 calculates a degree of non-uniformity of pixel values in the current block to be coded by using, for example, the inputted image signal in the block.

It is to be noted that the "degree of non-uniformity of pixel values" is, for example, a physical quantity that can be obtained by summing absolute values of differences between pixel values of pixels adjacent to each other in the current block to be coded. The flat region determination unit 111 calculates the degree of non-uniformity of pixel values, and compares the calculated value and the predetermined threshold.

When a result of the comparison shows that the degree of non-uniformity of pixel values is smaller than the threshold, the flat region determination unit 111 determines that the block is a flat region (YES in S202).

On the other hand, when a result of the comparison shows that the degree of non-uniformity of pixel values is equal to or greater than the threshold, the flat region determination unit 111 determines that the block is a non-flat region (NO in S202).

It is to be noted that the flat region determination unit 111 may determine whether or not the current block to be coded is a flat region by using the difference image signal calculated by the difference calculation unit 109 instead of the inputted image signal.

Further, the flat region determination unit 111 may perform the above-described determination by using a coefficient value for each frequency component which is generated by orthogonal transformation performed by the prediction residual coding unit. In this case, it can be determined that the current block to be coded is a flat region when coefficients concentrate in a low frequency region, and a non-flat region when coefficients disperse into a high frequency region.

Further, the flat region determination unit 111 may determine whether or not the current block to be coded is a flat region by using other methods.

The quantization width determination unit 102 determines a quantization width to be a value smaller than a value of a quantization width for quantizing a non-flat region macroblock (S203), only when the amount of change of camera control information is equal to or greater than the predetermined threshold (YES in 201) and the current block to be coded is a flat region (YES in S202).

The quantization width determined by the quantization width determination unit 102 is used for quantization performed by the prediction residual coding unit 103, as described above.

More specifically, the quantization width determination unit 102 determines quantization of the flat region where coding noise is noticeable, to be performed with a quantization width smaller than a quantization width for performing quantization of a non-flat region.

The quantization width determination unit 102 performs an operation to cause the quantization width of the block to be a smaller value than a predetermined quantization width that is the basis for quantizing the current block to be coded (base quantization width).

It is to be noted that to what extent the quantization width for the current block to be coded should be reduced may be determined by using other methods.

For example, in one method, a quantization width is reduced to equal to or smaller than a predetermined quantization width independently of the above-mentioned base quantization width at any time. In the flat region, there is a correlation between a quantization width and a visibility of noise. Thus, the quantization width is reduced to a specific value that embodies a level at which it is difficult to recognize a noise by human eyes. This makes it possible to prevent noticeable noise independent of a bit rate at any time.

Further, it may be possible to perform control that reduces, by only a specific fixed value, a quantization width that is a modulation width. Further, it may be possible to perform control that a value to be reduced from the base quantization width is made variable according to the base quantization width.

Figure 3:
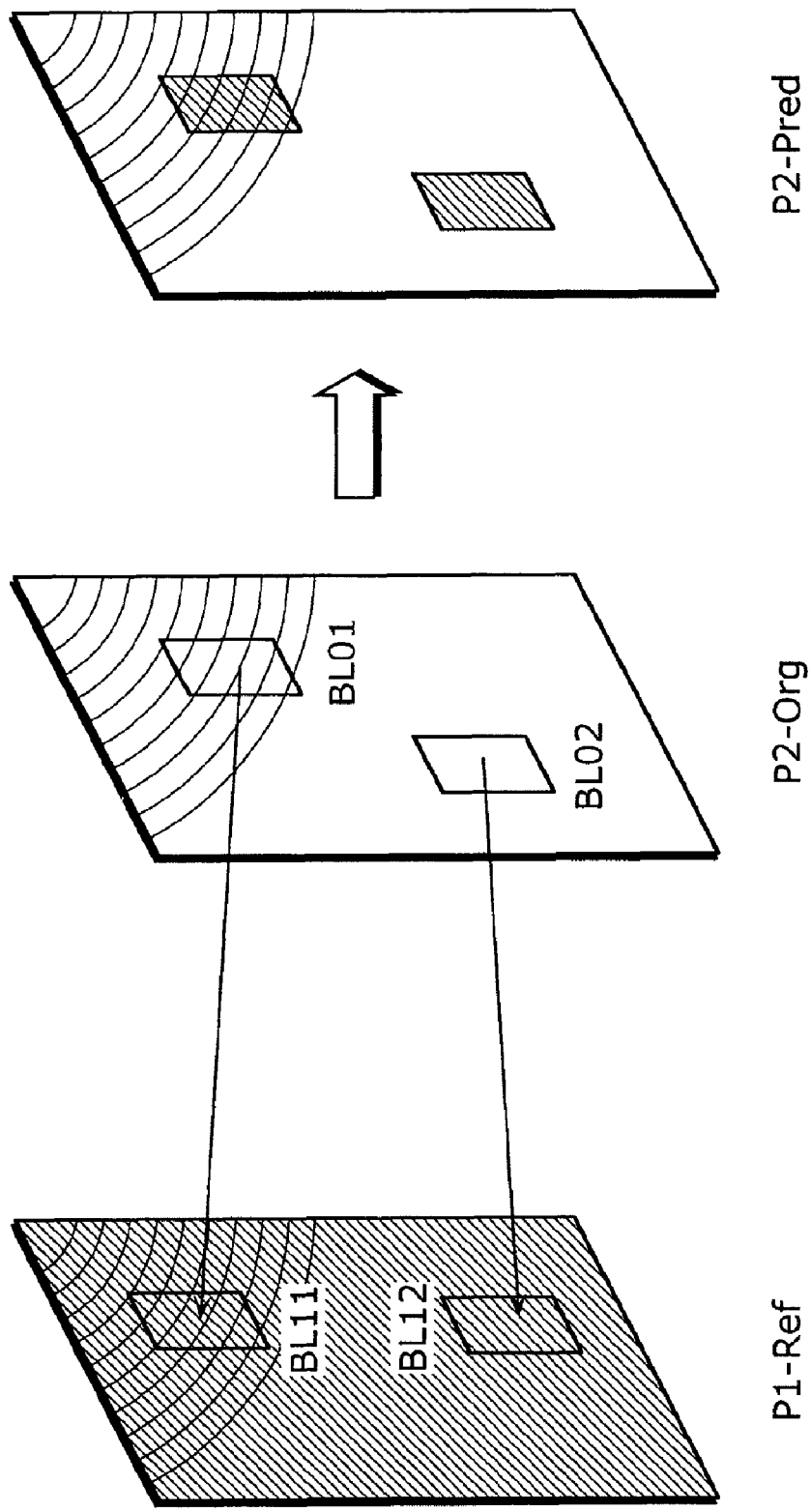
FIG. 3 is a schematic view for explaining a difference of an effect of the luminance change between a flat region and a non-flat region when performing inter picture prediction while luminance change is occurring.

FIG. 3 is a schematic view for explaining a difference of an effect of a luminance change between the flat region and the non-flat region when inter picture prediction is performed while luminance change is occurring.

It is to be noted that, in FIG. 3, P2-Org is a current picture to be coded and P1-Ref is a reference picture. In addition, P1-Ref has a lower luminance than that of P2-Org. In other words, the luminances in these pictures are different from each other.

Each picture includes an edge or a texture in the right upper part of the picture plane. The current block to be coded BL01 is in the non-flat region and predicted from the position of BL11. Further, the current block to be coded BL02 is in the flat region and predicted from the position of BL12.

It is assumed that a prediction picture P2-pred is generated as a result of the prediction. By adding residual data to the prediction picture, a coded image is ultimately generated.

Here, a degree of precision in decoding the residual data (an identity between a pixel value before coding and a pixel value after decoding) is restricted by a quantization width in the coding. Therefore, a prediction error ultimately causes, as coding noise, degradation in an image quality of coded image.

However, in the non-flat region such as the position of BL01, there is a tendency that even a prediction error caused by a luminance change in the same manner is difficult to be identified by human eyes due to other information including the edge or the texture.

On the other hand, in the flat region such as the position of BL02, only a minor error can be a noise noticeable to human eyes.

This characteristic is utilized in the moving picture coding apparatus 100 according to the present embodiment, and thus the image quality is improved by reducing the quantization width only in the flat region where the noise is visually noticeable when the luminance change has occurred. This makes it possible to effectively improve the image quality.

Further, a coding amount of coding the flat region is generally smaller than a coding amount of coding the non-flat region. Thus, the flat region has a characteristic that an increase in a coding amount resulting from an improvement in an image quality is relatively small.

FIG. 4 is a schematic view for explaining a difference of tendency of an amount of codes generated by coding between the flat region and the non-flat region.

The prediction residual is coded by performing orthogonal transformation on an inputted prediction residual coefficient to calculate an orthogonal transformation coefficient, quantizing the orthogonal transformation coefficient with a specified quantization width to obtain a coefficient value, and performing variable length coding on the obtained coefficient value.

As shown in FIG. 4, there is a tendency that the prediction residual coefficients are similar values in the flat region block overall and non-uniform in the non-flat region block.

Values of the orthogonal transformation coefficients obtained by performing orthogonal transformation on the prediction residuals concentrate in a low frequency region (around (0, 0) coefficient position), in the flat region block. Further, coefficients tend to disperse close to a high frequency region (around (3, 3) coefficient position) which is away from the low frequency region, in the non-flat region block.

Therefore, when reducing the quantization width in coding the flat region block, the number of the non-zero orthogonal transformation coefficient to be coded is small. Thus, the coding amount does not increase significantly.

On the other hand, when the quantization width is reduced in coding the non-flat region block, the coding amount rapidly increases since the number of the non-zero orthogonal transformation coefficients is great.

The moving picture coding apparatus 100 according to the present embodiment improves the image quality by reducing the quantization width only in the flat region as described above. More specifically, the increase in the coding amount accompanying the improvement in the image quality is minimized by utilizing the above-described characteristic of the flat region.

As described above, according to the moving picture coding apparatus 100 of the present embodiment, when a moving picture is coded, the quantization width at the time of coding is reduced in a region where degradation in the image quality is noticeable and where the increase in the coding amount accompanying the improvement in the image quality is small. This makes it possible to improve an image quality efficiently and effectively.

Second Embodiment

Figure 5:
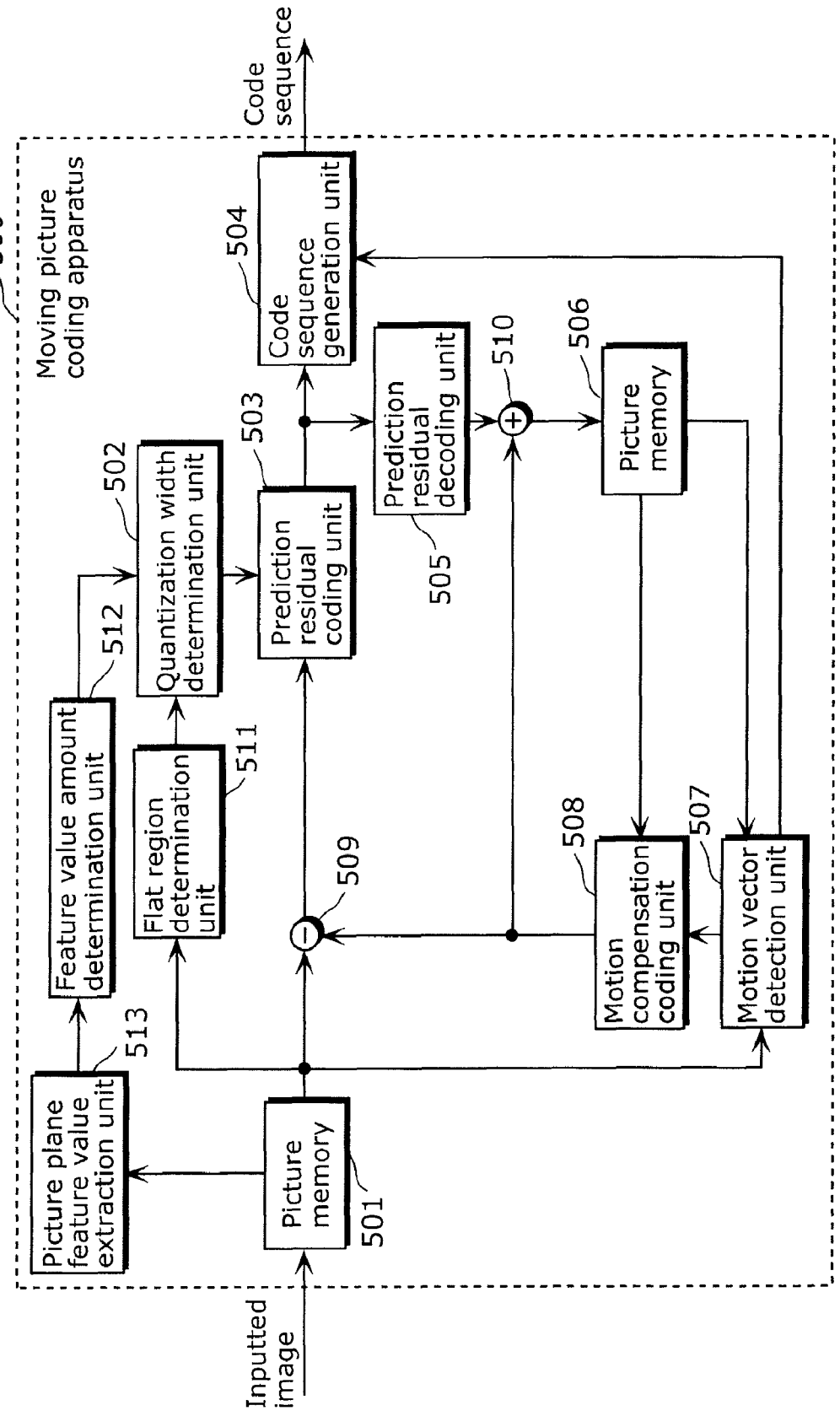
FIG. 5 is a block diagram which shows a major functional configuration of a moving picture coding apparatus according to a second embodiment of the present invention.

FIG. 5 is a block diagram which shows a major functional configuration of a moving picture coding apparatus 500 according to a second embodiment of the present invention.

It is to be noted that details of fundamental processing performed by a picture memory 501, a prediction residual coding unit 503, a code sequence generation unit 504, a prediction residual decoding unit 505, a picture memory 506, a motion vector detection unit 507, a motion compensation coding unit 508, a difference calculation unit 509, and an addition operation unit 510 are the same as details of fundamental processing performed by the moving picture coding apparatus 100 according to the first embodiment (see, FIG. 1).

Therefore, description as to the details of fundamental processing performed by the processing units will be omitted, and processes, performed by a feature value amount determination unit 512, a flat region determination unit 511, and a quantization width determination unit 502, for determining a value of the quantization width used when performing quantization in a prediction residual coding unit 503 will be described in detail.

The flat region 511 determines whether or not a current block to be coded is a flat region. The feature value amount determination unit 512 determines whether or not the amount of a picture plane feature value that has been extracted from an inputted image by the picture plane feature value extraction unit 513 is equal to or greater than a predetermined threshold.

Each result of the determinations is inputted into the quantization width determination unit 502. The quantization width determination unit 502 determines the quantization width by using the determination results, and inputs the determined quantization width into the prediction residual coding unit 503.

It is to be noted that the feature value amount determination unit 512 is the second example of a processing unit that performs a luminance change determination step in the moving picture coding method of the present invention.

Processing flow described above is summarized in a flowchart of FIG. 6(*a*).

Figure 6:
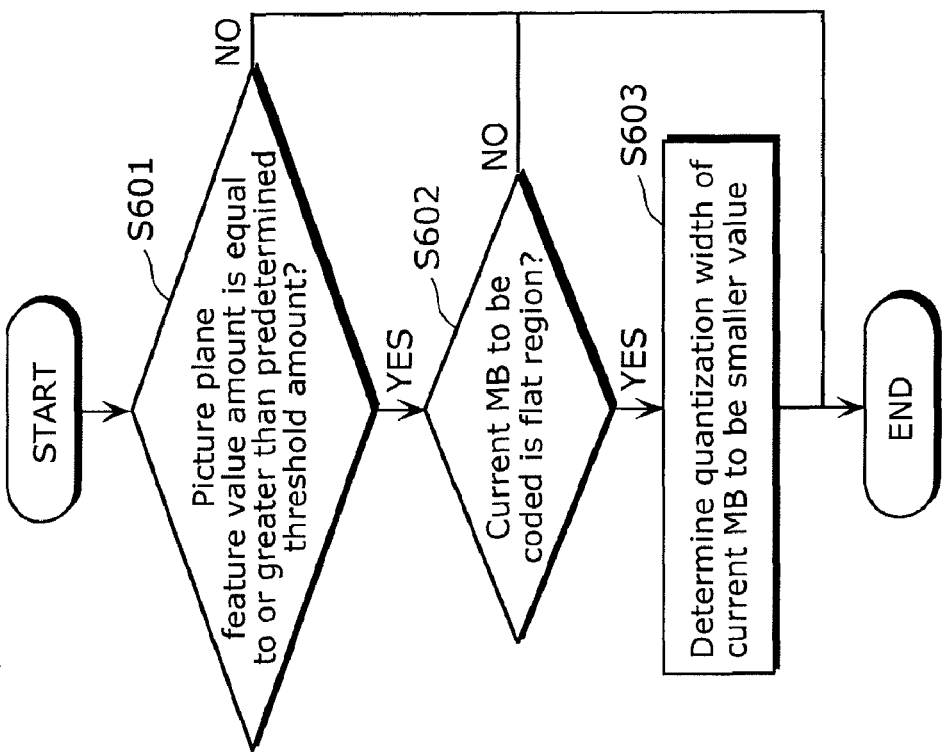
FIG. 6(a) is a flow chart which shows a processing flow of determining a quantization width of the moving picture coding apparatus according to the second embodiment.
FIG. 6(b) is a diagram which shows an example of a picture plane feature value related to a luminance change.
Figure 6:
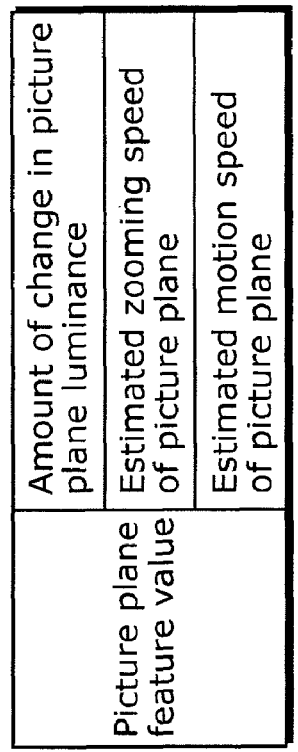

FIG. 6(*a*) is a flowchart which shows a processing flow of determining a quantization width of the moving picture coding apparatus 500 according to the second embodiment.

The feature value amount determination unit 512 determines whether or not the amount of the picture plane feature value inputted from the picture plane feature value extraction unit 513 is equal to or greater than the predetermined threshold (S601).

More specifically, the feature value amount determination unit 512 uses, for the determination, a picture plane feature value related to a temporal luminance change in a moving picture to be coded. An example of a picture plane feature value used for the determination is shown in FIG. 6(*b*).

FIG. 6(*b*) is a diagram which shows an example of a picture plane feature value related to a luminance change.

The feature value amount determination unit 512 performs the above-described determination by using at least one of an amount of change in a picture plane luminance, an estimated zooming speed of the picture plane, and an estimated motion speed of the picture plane.

In the case where the estimated zooming speed of the picture plane at a certain point is equal to or greater than the predetermined threshold specified for the zooming speed, for example, it can be determined that a luminance change of equal to or greater than the predetermined amount has occurred between the current picture to be coded and the reference picture due to a rapid expansion or reduction of an imaging area, or that there is a possibility of the occurrence.

Further, in the case where the estimated motion speed of the picture plane at a certain point is equal to or greater than the predetermined threshold specified for the motion speed, for example, it can be determined that a luminance change of equal to or greater than the predetermined amount has occurred between the current picture to be coded and the reference picture due to a rapid switching between imaging objects, or that there is a possibility of the occurrence The feature value amount determination unit 512 compares the picture plane feature value and the predetermined threshold as described above. With this, it is determined whether or not a luminance change of equal to or greater than the predetermined amount has occurred between the current picture to be coded and the reference picture that has been obtained from previous coding.

In the case where the picture plane feature value is greater than the predetermined threshold (YES in S601), the feature value amount determination unit 512 notifies the quantization width determination unit 502 accordingly.

Next, the flat region determination unit 511 determines whether or not the current block to be coded is a flat region (S602).

It is to be noted that the technique used for determining whether or not the current block to be coded is a flat region performed by the flat region determination unit 511 is the same as the flat region determination unit 111 of the first embodiment.

More specifically, the flat region determination unit 511 calculates a degree of non-uniformity of pixel values in the current block to be coded by using, for example, the inputted image signal in the block. Further, the flat region determination unit 511 compares the degree of non-uniformity that has been calculated and the predetermined threshold. The flat region determination unit 511 determines that the block is a flat region in the case where a result of the comparison shows that the degree of non-uniformity of pixel values is smaller than the threshold, (YES in S602), and determines that the block is a non-flat region in the case where the result of the comparison shows that the degree of non-uniformity of pixel values is equal to or greater than the threshold (NO in S602).

It is to be noted that the flat region determination unit 511 may determine whether or not the current block to be coded is a flat region by using a difference image signal calculated by the difference calculation unit 509 instead of the inputted image signal, or a coefficient value for each frequency component which is generated by orthogonal transformation performed by the prediction residual coding unit 503, just as in the flat region determination unit 111 of the first embodiment.

Further, the flat region determination unit 511 may determine whether or not the current block to be coded is a flat region by using other methods.

The quantization width determination unit 502 determines the quantization width to be a smaller value than a value of the quantization width for quantizing a macroblock that is a non-flat region (S603) only in the case where the picture plane feature value is equal to or greater than the predetermined threshold (YES in 601) and where the current block to be coded is a flat region (YES in S602).

The quantization width determined by the quantization width determination unit 502 is used for quantization performed by the prediction residual coding unit 503.

More specifically, the quantization width determination unit 502 determines quantization of the flat region where coding noise is noticeable, to be performed with a quantization width smaller than a quantization width for performing quantization of a non-flat region.

For example, the quantization width determination unit 502 performs processing for determining the quantization width for the block to be a smaller value than a value of the predetermined base quantization width.

It is to be noted that other methods may be used for determining to what extent the quantization width for the current block to be coded should be reduced.

For example, in one method, a quantization width is reduced to equal to or smaller than a predetermined quantization width independently of the above-mentioned base quantization width at any time, just as in the first embodiment. Further, it may be possible to perform control that reduces, by a specific fixed value, a quantization width that is a modulation width. Further, it may be possible to perform control that a value to be reduced from the base quantization width is made variable according to the base quantization width.

The moving picture coding apparatus 500 according to the second embodiment limits an object to be quantized with a small quantization width to the region where there is a great luminance change between a reference and where it is a flat region, as described above. This makes it possible to minimize an increase in a coding amount and effectively prevents coding noise, just as in the moving picture coding apparatus 100 of the first embodiment.

However, the moving picture coding apparatus 500 according to the second embodiment, unlike the moving picture coding apparatus 100 according to the first embodiment, does not need camera control information obtained from a camera.

Therefore, even a coding apparatus that cannot obtain camera control information, such as a coding apparatus in a digital video recorder and a coding apparatus in a digital video camera that does not have a feature to cooperate with a camera, can improve an image quality efficiently and effectively, by employing the configuration of the moving picture coding apparatus 500.

Thus, the moving picture coding apparatus 500 achieves, even when camera control information cannot be obtained, improving image quality efficiently and effectively while minimizing an increase in a coding amount, by improving an image quality of the flat region where a noise is visually noticeable.

Third Embodiment

Figure 7:
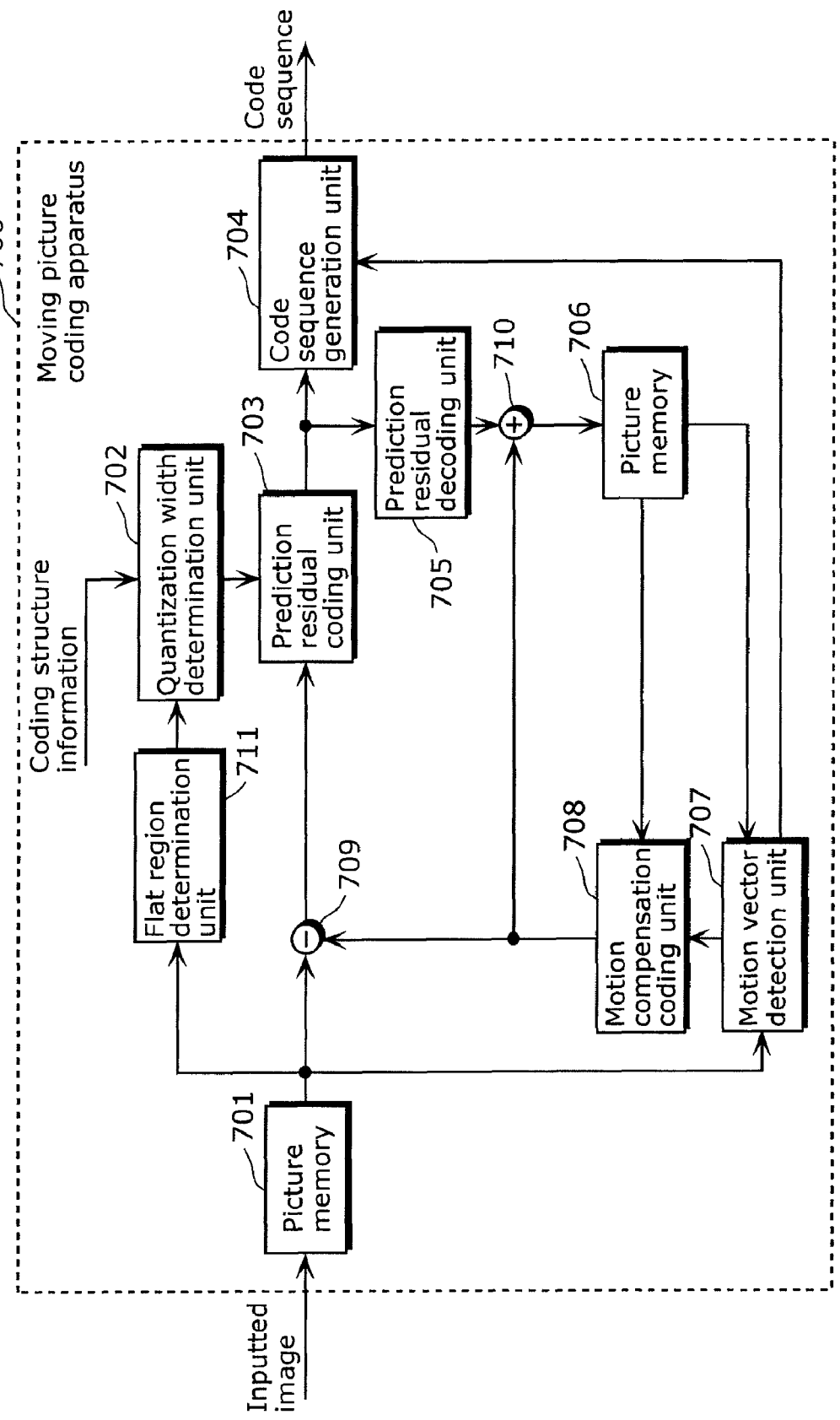
FIG. 7 is a block diagram which shows a major functional configuration of a moving picture coding apparatus according to a third embodiment of the present invention.

FIG. 7 is a block diagram which shows a major functional configuration of a moving picture coding apparatus 700 according to a third embodiment of the present invention.

It is to be noted that details of fundamental processing performed by a picture memory 701, a prediction residual coding unit 703, a code sequence generation unit 704, a prediction residual decoding unit 705, a picture memory 706, a motion vector detection unit 707, a motion compensation coding unit 708, a difference calculation unit 709, and an addition operation unit 710 are the same as details of fundamental processing performed by the moving picture coding apparatus 100 according to the first embodiment (see, FIG. 1).

Therefore, descriptions for the details of the fundamental processing performed by these processing units will be omitted and processing performed by the flat region determination unit 711 and the quantization width determination unit 702 for determining the value of the quantization width that is used when performing quantization in the prediction residual coding unit 703.

The flat region 711 determines whether or not a current block to be coded is a flat region. A result of the determination is inputted into the quantization width determination unit 702. Further, coding structure information is inputted into the quantization width determination unit 702.

It is to be noted that the "coding structure information" according to the present embodiment is information that indicates: the type of the current picture to be coded (I, P, or B); and which of the frame coding or the field coding is performed on the current picture to be coded.

For example, coding structure information is inputted into the quantization width determination unit 702 from a control unit (not illustrated) that controls an operation of the moving picture coding apparatus 700.

The quantization width determination unit 702 determines the quantization width by using the determination result and the coding structure information, and inputs the determined quantization width into the prediction residual coding unit 703.

It is to be noted that the quantization width determination unit 702 is the third example of a processing unit that performs a luminance change determination step in a moving picture coding method of the present invention. More specifically, the quantization width determination unit 702 is capable of determining whether or not a luminance change equal to or greater than a predetermined amount has occurred, by referring to the coding structure information.

Figure 8:
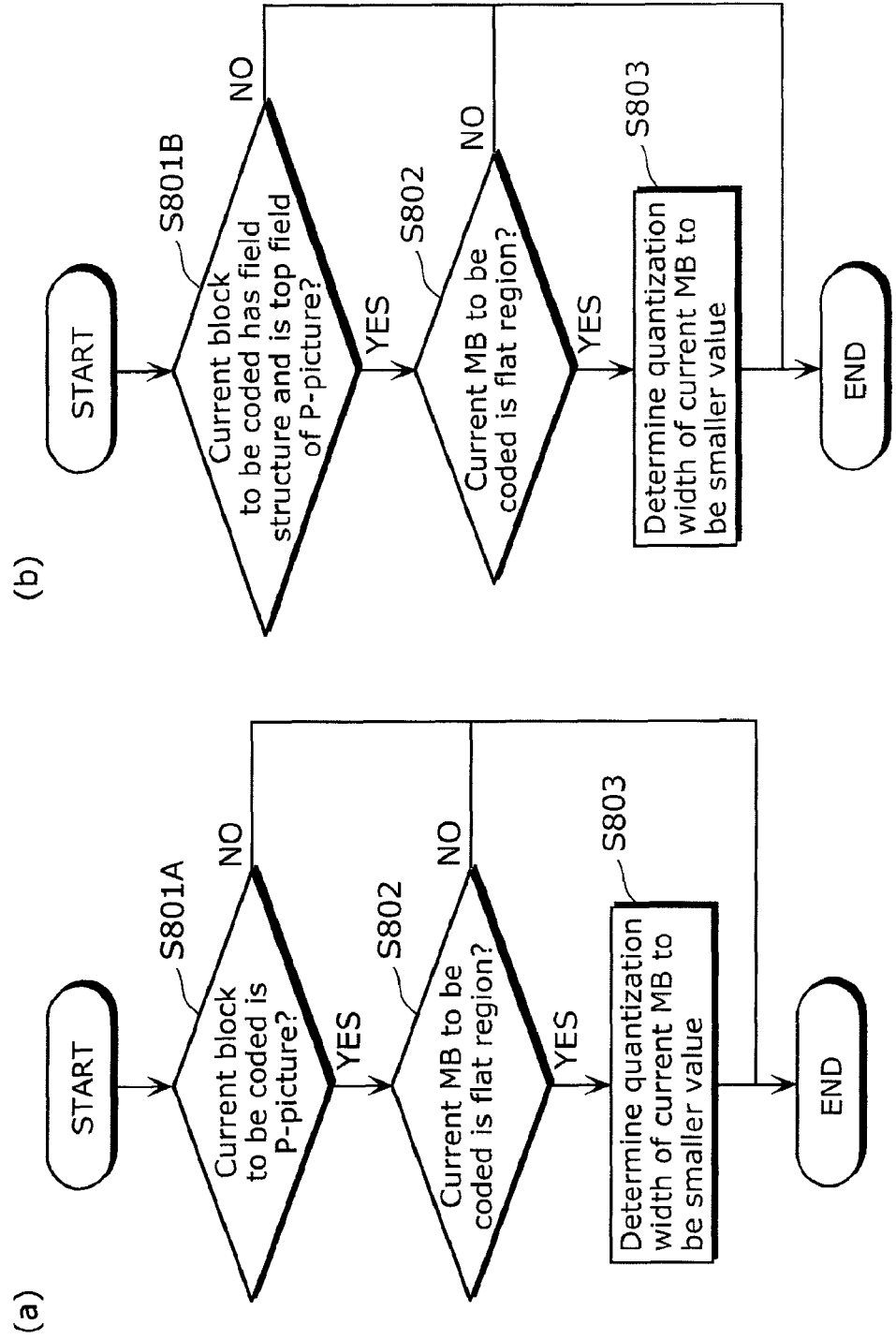
FIG. 8(a) is a flow chart which shows a first example of a processing flow of determining a quantization width of the moving picture coding apparatus according to the third embodiment.
FIG. 8(b) is a flowchart which shows a second example of the processing flow of determining a quantization width of the moving picture coding apparatus according to the third embodiment.

An example of the above-described processing flow is shown in FIG. 8(*a*).

FIG. 8(*a*) is a flowchart which shows the first example of the processing flow of determining a quantization width of the moving picture coding apparatus 700 according to the third embodiment.

The quantization width determination unit 702 determines whether or not a current block to be coded is a block included in a picture to be coded as a P-picture, by referring to the coding structure information (S801A).

Next, the flat region determination unit 711 determines whether or not the current block to be coded is a flat region (S802).

It is to be noted that the technique used for determining whether or not the current block to be coded is a flat region performed by the flat region determination unit 711 is the same as the flat region determination unit 111 of the first embodiment.

More specifically, the flat region determination unit 711 calculates a degree of non-uniformity of pixel values in the current block to be coded by using, for example, the inputted image signal in the block. Further, the flat region determination unit 711 compares the degree of non-uniformity that has been calculated and the predetermined threshold. The flat region determination unit 711 determines that the block is a flat region in the case where a result of the comparison shows that the degree of non-uniformity of pixel values is smaller than the threshold, (YES in S802), and determines that the block is a non-flat region in the case where the result of the comparison shows that the degree of non-uniformity of pixel values is equal to or greater than the threshold (NO in S802).

It is to be noted that the flat region determination unit 711 may determine whether or not the current block to be coded is a flat region by using a difference image signal calculated by the difference calculation unit 709 instead of the inputted image signal, or a coefficient value for each frequency component, which is generated by orthogonal transformation performed by the prediction residual coding unit 703, just as in the flat region determination unit 111 of the first embodiment.

Further, the flat region determination unit 711 may determine whether or not the current block to be coded is a flat region by using other methods.

The quantization width determination unit 702 determines the quantization width to be a smaller value than a value of the quantization width for quantizing a macroblock that is a non-flat region only in the case where the current block to be coded is a block included in a picture to be coded as a P-picture (YES in S801A) and where the current block to be coded is a flat region (YES in S802).

The quantization width determined by the quantization width determination unit 702 is used for quantization performed by the prediction residual coding unit 703.

More specifically, the quantization width determination unit 702 determines quantization of the flat region where coding noise is noticeable to be performed with a quantization width smaller than a quantization width for performing quantization of a non-flat region.

For example, the quantization width determination unit 702 determines the quantization width for the block to be a smaller value than a value of the predetermined base quantization width.

It is to be noted that other methods may be used for determining to what extent the quantization width for the current block to be coded should be reduced.

For example, in one method, a quantization width is reduced to equal to or smaller than a predetermined quantization width independently of the above-mentioned base quantization width at any time, just as in the first embodiment. Further, it may be possible to perform control that reduces, by only a specific fixed value, a quantization width that is a modulation width. Further, it may be possible to perform control that a value to be reduced from the base quantization width is made variable according to the base quantization width.

Further, the quantization width determination unit 702 may determine whether or not the current block to be coded has a field structure and is included in a field to be coded ahead, in a coding order, among two fields of a picture to be coded as a P-picture, by referring to the coding structure information, as shown in FIG. 8(*b*) (S801B).

More specifically, when the current block to be coded is the block included in the picture to be coded as the P-picture, and when the current block to be coded is the picture included in the field to be coded ahead in a coding order, a time interval from the current block to be coded to a reference picture is relatively great in both cases.

Further, the greater the time period from the picture to be coded and the reference picture is, the higher possibility of luminance change equal to or greater than a predetermined amount has likely occurred. Therefore, the moving picture coding apparatus 700 according to the third embodiment uses the coding structure information of the current block to be coded as one piece of reference information for controlling the coding width.

Figure 9:
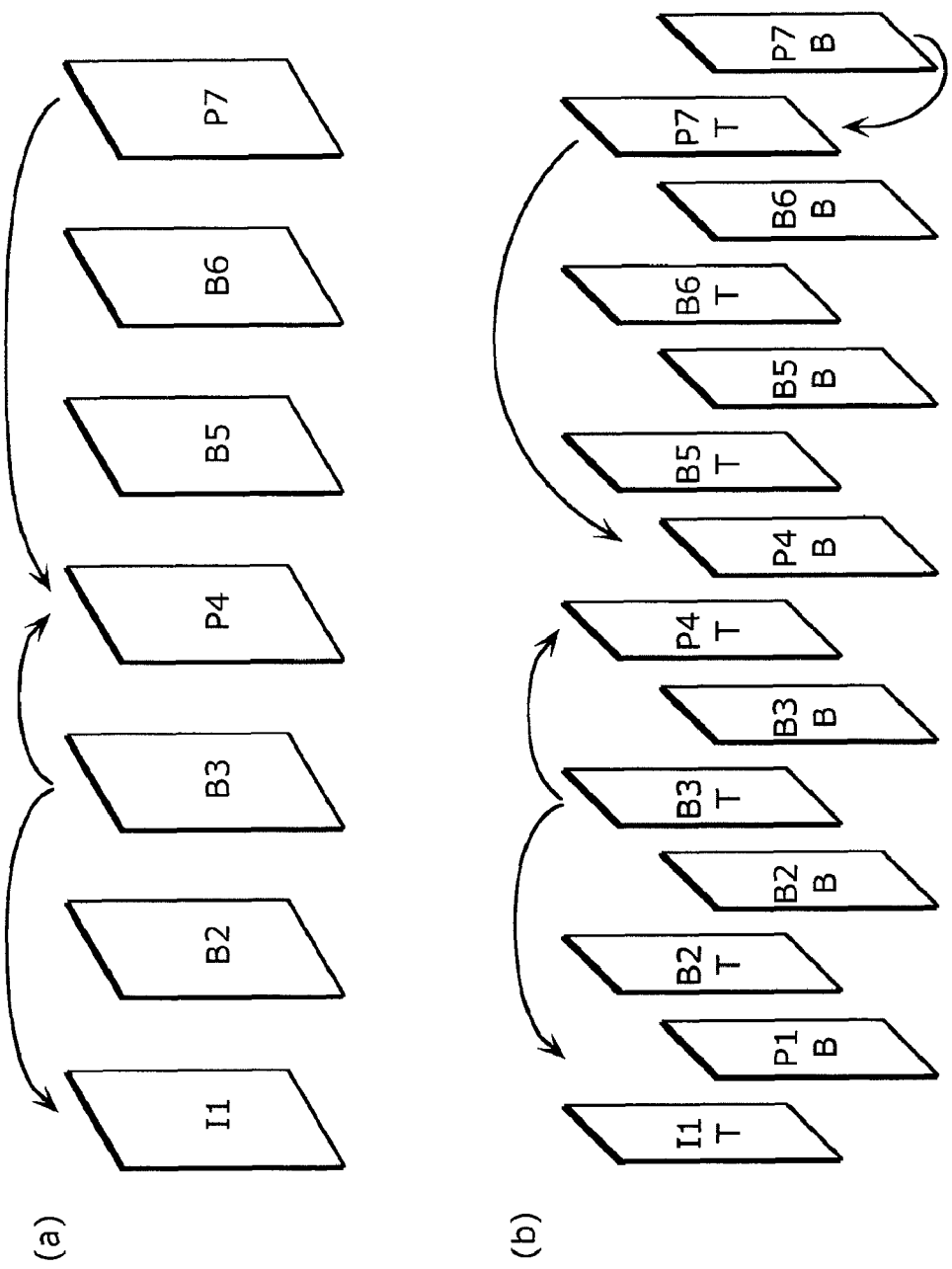
FIG. 9(a) is a diagram which shows a general reference relationship in the case of frame coding.
FIG. 9(b) is a diagram which shows a general reference relationship in the case of field coding.

FIGS. 9(*a*) and 9(*b*) are schematic views for explaining a difference of susceptibility to an effect of luminance change which depends on a coding structure.

It is to be noted that FIG. 9(*a*) is a diagram that indicates a general reference relationship in the case of a frame coding, and FIG. 9(b) is a diagram that indicates a general reference relationship in the case of a field coding.

Further, FIG. 9(a) and FIG. 9(b) show that a picture indicated by a tip of an arrow is referred to when a picture positioned at a starting point of the arrow is coded.

Further, in FIGS. 9(a) and 9(b), pictures which can be used for reference are defined as only an I-picture and a P-picture, and the P-picture refers, as a picture to be referred to, to a temporally preceding single picture positioned closest, and a B-picture refers to temporally preceding and following pictures positioned closest.

FIG. 9(a) shows an example of the case where frame coding is performed on each of the pictures. More specifically, B3 that is a B-picture refers to I1 and P4, and P7 that is a P-picture refers only to P4.

Here, in the case where a luminance change occurs, as a time interval between the current picture to be coded and the reference picture expands, an effect of the luminance change becomes greater, and thus a prediction error increases.

For example, B3 can refer to P4 which is temporally separated by one frame with respect to B3. However, P7 can only refer to P4 which is temporally separated by three frames with respect to P7. Therefore, the P-picture is more susceptible to the effect of a luminance change.

Further, FIG. 9(b) shows an example of the case where field coding is performed on each of the pictures. More specifically, B3T that is a top field of a B-picture refers to P1B and P4T, P7T that is the top field of a P-picture refers only to P4B, and P7B that is a bottom field of a P-picture refers only to P7T.

For example, B3T can refer to P4T which is temporally separated by two fields with respect to B3T, and P7B can refer to P7T which is temporally separated by one field with respect to P7B.

However, P7T can only refer to P4B which is temporally separated by five fields with respect to P7T. Therefore, in the case of the field structure, the top field of a P-picture is affected most by a luminance change.

It is to be noted that, in the case where a bottom field is coded ahead among a top field and the bottom field which are included in a single P picture, the bottom field is affected most by a luminance change.

As described above, in the case where an object to be coded is coded as a part of a P picture or as a part of a field to be coded ahead, in a coding order, among two fields included in a P-picture (hereinafter referred to as "preceding field") (these cases are referred to as "the case where the object to be coded is a P-picture or a preceding field"), a time interval between the object to be coded and a reference picture is relatively great.

Therefore, the P-picture and the preceding field are strongly affected by a luminance change. In other words, there is a possibility that a luminance change equal to or greater than the predetermined amount has occurred between the P-picture or the preceding field which are objects to be coded and the reference picture.

The moving picture coding apparatus 700 according to the present invention efficiently and effectively improve an image quality by utilizing this feature. More specifically, the moving picture coding apparatus 700, when coding a series of moving images, reduces a quantization width in a flat region of only a P-picture or a preceding field, thereby improving image quality.

This makes it possible to improve the image quality effectively while minimizing an increase in a coding amount. Further, since there is no need to use camera control information or a picture plane feature value, it is possible even for a coding apparatus that cannot use such information to improve an image quality efficiently and effectively, by employing the configuration of the moving picture coding apparatus 700.

A Modification of the Third Embodiment

It has been described that the quantization width of only a P-picture or a preceding field is reduced according to the third embodiment.

However, it is also possible to efficiently and effectively improve an image quality by reducing a greater amount of a quantization width in a P-picture or a preceding field, and reducing a smaller amount of a quantization width in other pictures. Here, a processing flow of this will be explained as a modification of the third embodiment.

Figure 10:
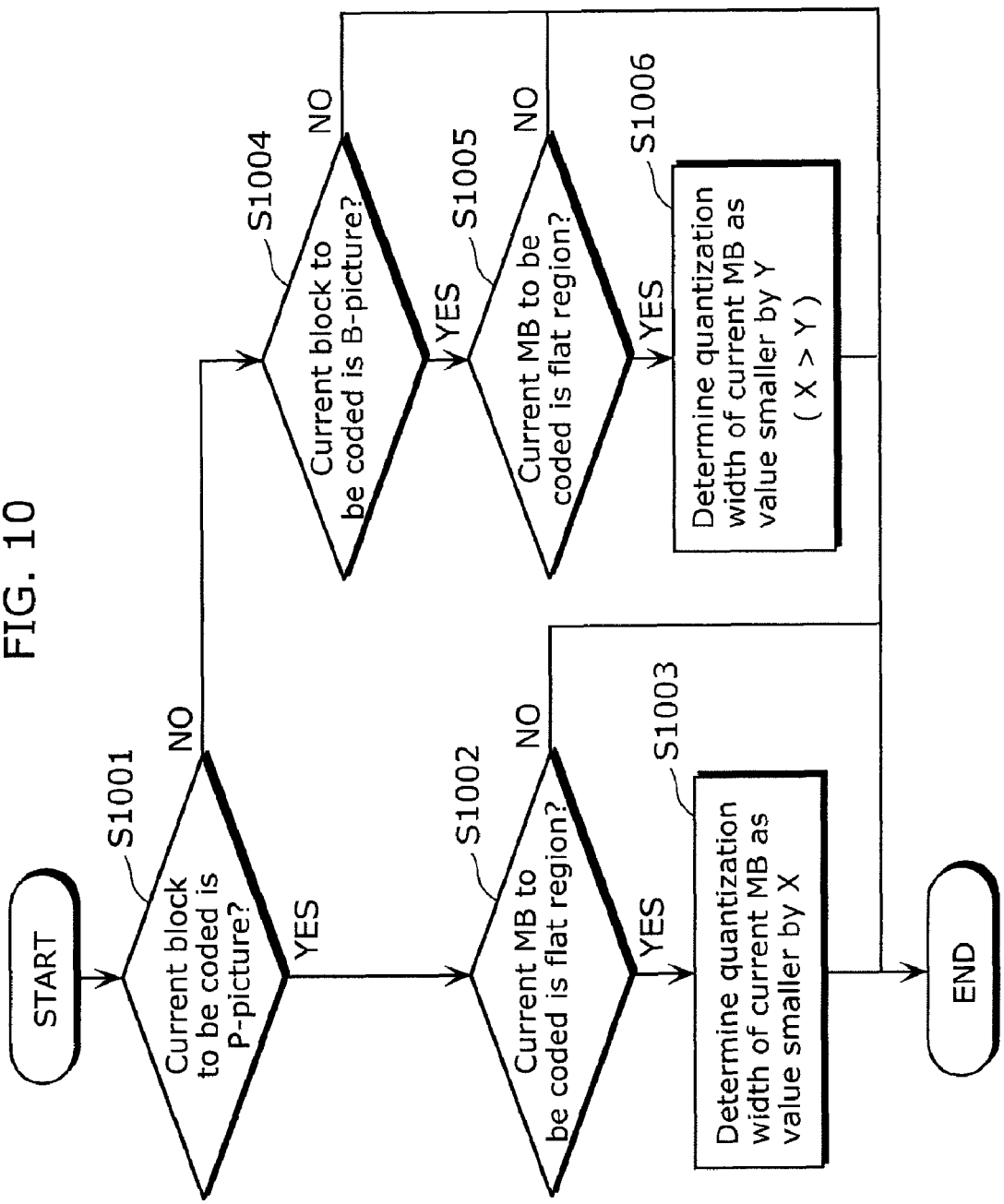
FIG. 10 is a flowchart which shows an example of a processing flow of a modification example of the third embodiment.

FIG. 10 is a flowchart which shows an example of the processing flow of a modification example of the third embodiment.

As shown in FIG. 10, in the case where the quantization width determination unit 702 determines that the current picture to be coded is a P-picture (YES in S1001) and the flat region determination unit 711 determines that the current block to be coded is a flat region (YES in S1002), the quantization width determination unit 702 determines the quantization width as a value smaller by X than a base quantization width.

Further, in the case where the quantization width determination unit 702 determines that the current picture to be coded is not a P-picture (NO in S1001) and the flat region determination unit 711 determines that the current block to be coded is a flat region (YES in S1005), the quantization width determination unit 702 determines the quantization width as a value smaller by Y than a base quantization width.

It is to be noted that the above-mentioned X and Y are in an X>Y relation. More specifically, in the case where the current block to be coded is the flat region, the quantization width of the current block to be coded is determined so as to be Q0>Q2>Q1, where Q1 is a quantization width when the current block to be coded is included in a P-picture, Q2 is a quantization width when the current block to be coded is included in a B-picture, and Q0 is the base quantization width.

Figure 11:
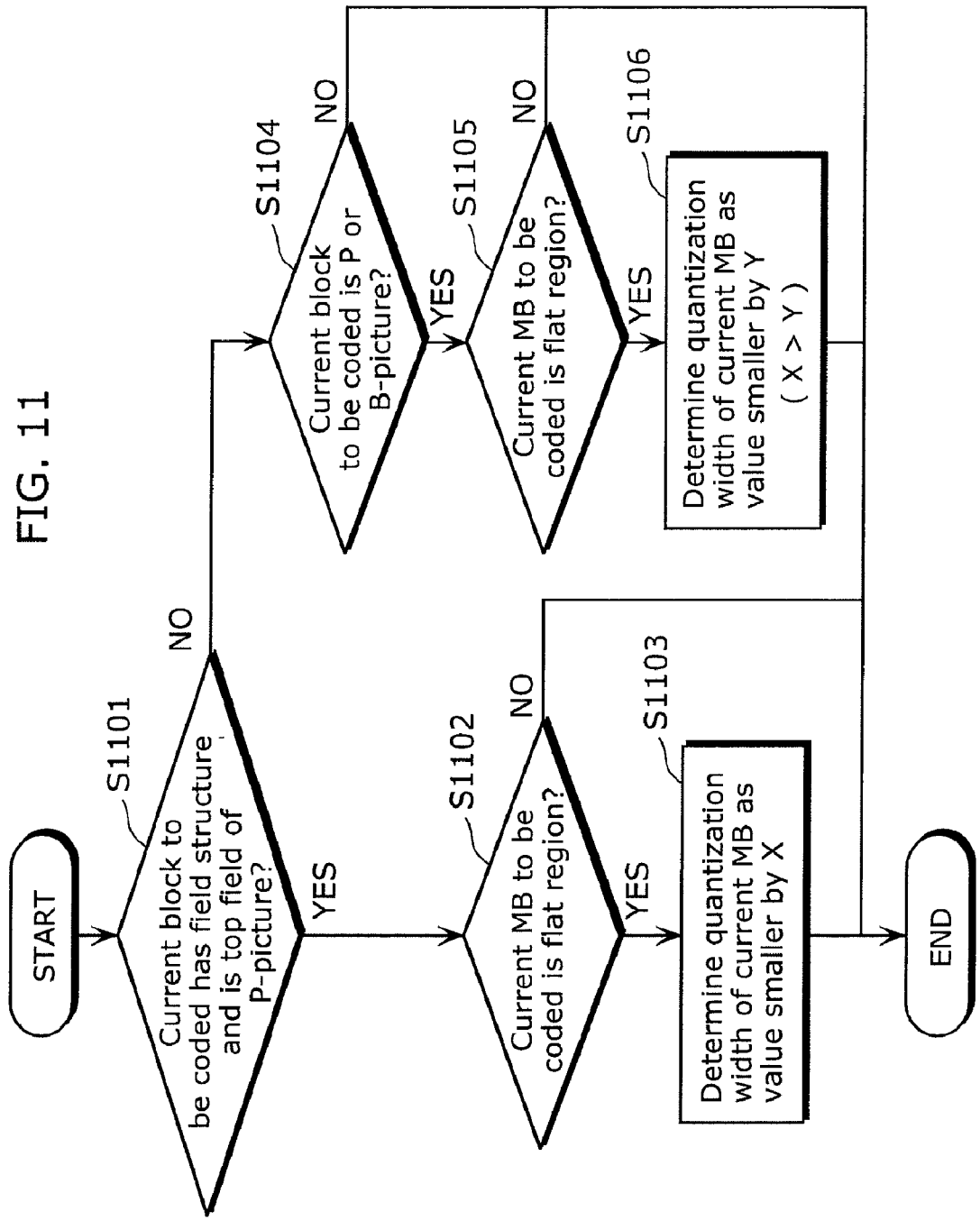
FIG. 11 is a flowchart which shows another example of a processing flow of the modification example of the third embodiment.

FIG. 11 is a flowchart which shows another example of the processing flow of the modification example of the third embodiment.

As shown in FIG. 11, in the case where the quantization width determination unit 702 determines that the current picture to be coded is a top field of a P-picture (YES in S1101) and the flat region determination unit 711 determines that the current block to be coded is a flat region (YES in S1102), the quantization width determination unit 702 determines the quantization width as a value smaller by X than a base quantization width.

Further, in the case where the quantization width determination unit 702 determines that the current picture to be coded is not a top field of a P-picture (NO in S1101) but a P-picture or a B-picture (YES in S1104) and the flat region determination unit 711 determines that the current block to be coded is a flat region (YES in S1105), the quantization width determination unit 702 determines the quantization width as a value smaller by Y than the base quantization width.

It is to be noted that the "P-picture" of the determination step S1104 is an expression which includes the P-picture of the frame structure and the bottom field of the P-picture of the field structure.

Further, the above-mentioned X and Y are in an X>Y relation. More specifically, in the case where the current block to be coded is the flat region, the quantization width of the current block to be coded is determined so as to be Q0>Q2>Q1, where Q1 is a quantization width when the current block to be coded is included in a top field of a P-picture, Q2 is a quantization width when the current block to be coded is included in a P-picture or a B-picture, and Q0 is the base quantization width.

Further, in the processing as shown in FIG. 11, it is determined that whether or not the object to be coded is the top field of a P-picture (S1101). In this determination, it is presupposed that the field to be coded ahead (preceding field) among the top field and the bottom field is the top field.

More specifically, in the case where the preceding field is the bottom field, the process proceeds to the determination whether or not the current block to be coded is the flat region when the object to be coded is the bottom field.

In the processing as shown in FIG. 10 and FIG. 11, an image quality is improved by not only significantly reducing the quantization width of the flat region included in the P-picture or the preceding field both of which is most likely to be affected when a luminance change occurs, but also slightly reducing the quantization width of the flat region in other pictures.

This produces an advantageous effect that an image quality is effectively improved while minimizing an increase in a coding amount in the case where a luminance change occurs which causes a severe degradation in an image quality even though a time interval between a coded picture and a reference picture is small.

It is to be noted that the processing details described in the third embodiment may be performed in combination with the processing details described in the first embodiment or the second embodiment.

For example, the determination whether or not an object to be coded is a P-picture or a top field of a P-picture (S1001 in FIG. 10 or S1101 in FIG. 11) according to the third embodiment may be performed in combination with the determination whether or not the amount of change of camera control information is equal to or greater than a threshold (S201 in FIG. 2(a)) according to the first embodiment.

Figure 12:
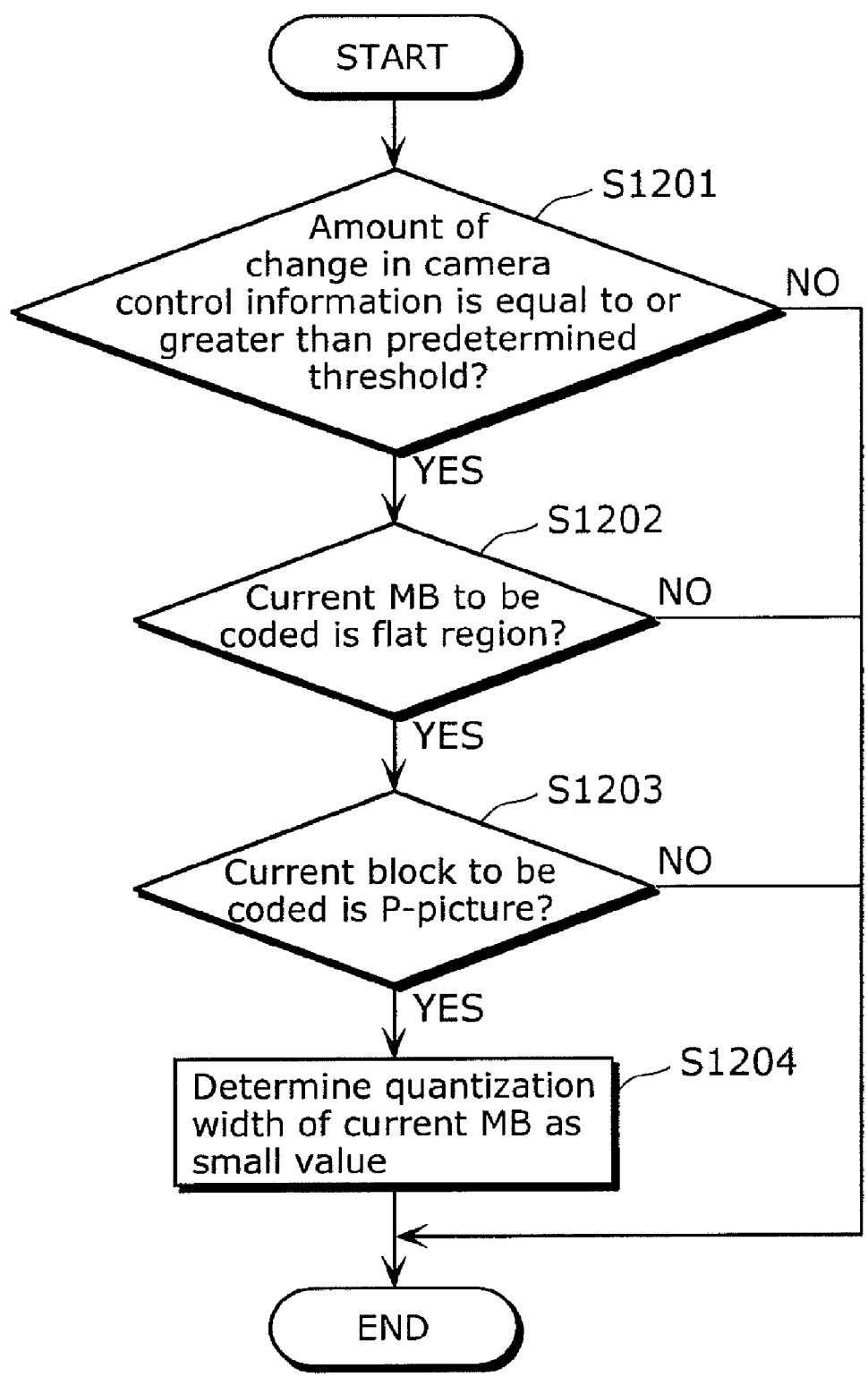
FIG. 12 is a diagram which shows an example of a processing flow of a quantization width control which takes into consideration both of camera control information and coding structure information.

FIG. 12 is a diagram which shows an example of a processing flow of a quantization width control which takes into consideration both of camera control information and coding structure information.

As shown in FIG. 12, in the case where the amount of change of camera control information is equal to or greater than the threshold (YES in S1201), the current block to be coded is a flat region (YES in S1202), and the current picture to be coded is a P-picture (YES in S1203), the quantization width for quantizing the current block to be coded is determined to be a small value (S1204).

This processing narrows down, further than in the first embodiment to the third embodiment, the block to be quantized with a quantization width smaller than others, that is, the block to which a coding amount greater than others is assigned.

Therefore, the increase in the coding amount accompanying the improvement in the image quality is prevented more than in the first embodiment to the third embodiment.

Further, for example, the determination whether or not an object to be coded is a P-picture or a top field of a P-picture (S1001 in FIG. 10 or S1101 in FIG. 11) according to the third embodiment may be performed in combination with the determination whether or not the amount of the picture plane feature value is equal to or greater than the threshold (S601 in FIG. 6(a)) according to the second embodiment.

This processing, as well as the processing as shown in FIG. 12, produces an advantageous effect that an increase in the coding amount accompanying the improvement in the image quality is prevented more than in the first embodiment to the third embodiment.

Fourth Embodiment

Further, a program for embodying the moving picture coding methods as indicated in each of the above-described embodiments may be recorded on a recording medium such as a flexible disk. This makes it possible to perform easily the processes described in each of the above-described embodiments by using an independent computer system.

It is to be noted that the recording medium is not limited to the flexible disk, but other recording media, such as an optical disk, an IC card, and a ROM cassette, may also be implemented as long as they can record the program.

Furthermore, an LSI that is an integrated circuit may be employed for performing the processing, so that the moving picture coding method described in each of the above-mentioned embodiments is embodied. Further, a part or all of the processes included in the moving picture coding method may be integrated into a single chip. The LSI here can be referred to as an IC, a system LSI, a super LSI, or an ultra LSI, depending on the degree of integration.

Figure 13:
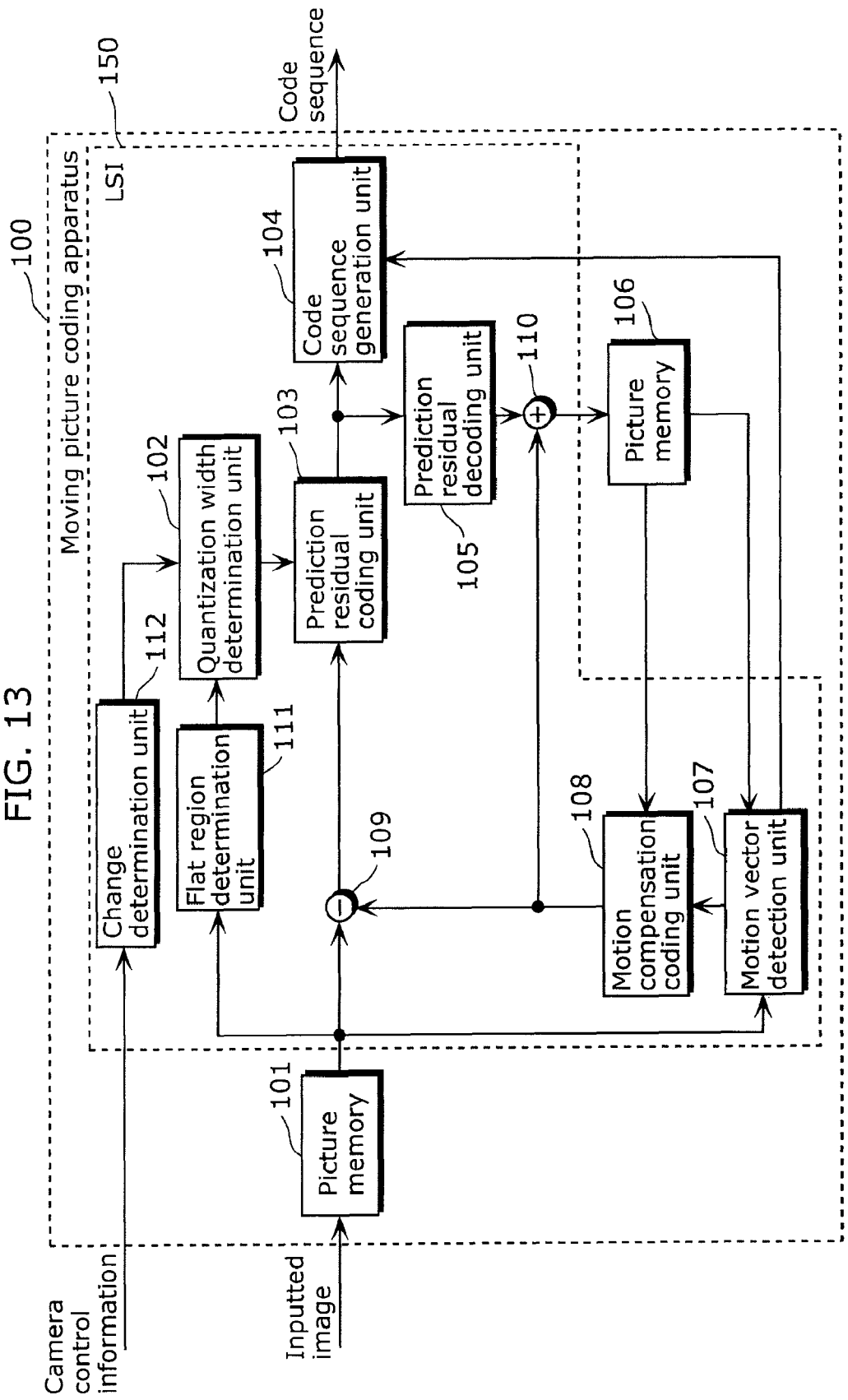
FIG. 13 is a diagram which shows an example of integration of circuit in the moving picture coding apparatus according to the first embodiment.
Figure 14:
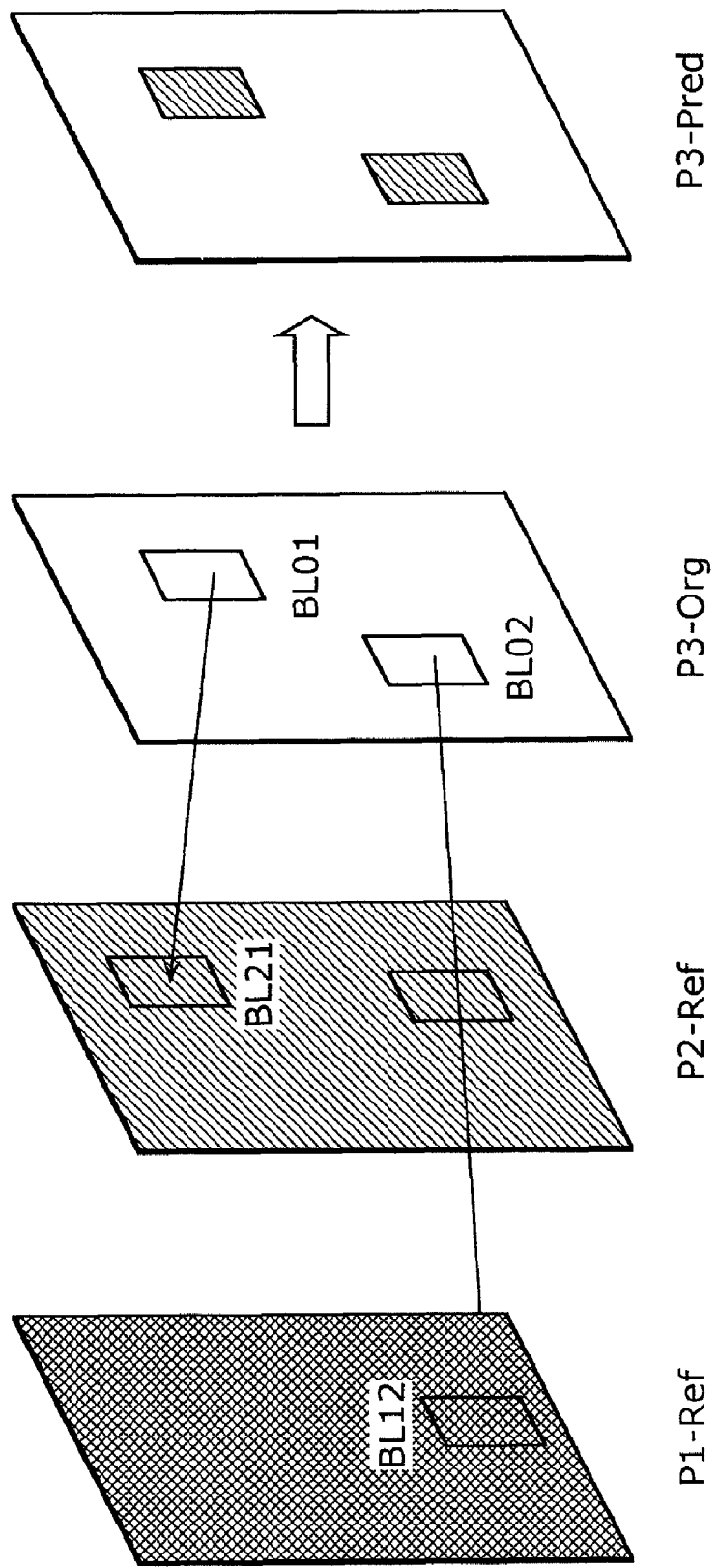
FIG. 14 is a schematic view for explaining an effect of a luminance change on inter picture prediction according to a conventional technique.

FIG. 13 is a diagram which shows an example of integration of circuit in the moving picture coding apparatus 100 according to the first embodiment.

The LSI 150 as shown in FIG. 13 is an example of an integrated circuit that includes functional blocks included by the moving picture coding apparatus 100.

It is to be noted that the functional blocks may be included in plural LSIs separately, instead of in a single LSI.

Further, a part or all of the functional blocks included in each of the moving picture coding apparatus 500 according to the second embodiment and the moving picture coding apparatus 700 according to the third embodiment can also be integrated into an integrated circuit.

Furthermore, the technique for integration of circuit is not limited to an LSI, and implementation with a dedicated circuit or a general-purpose processor is also available. It is also acceptable to use a Field Programmable Gate Array (FPGA) that is programmable after the LSI has been manufactured, and a reconfigurable processor in which connections and settings of circuit cells within the LSI are reconfigurable.

Furthermore, when a technology for the integrated circuit replacing the LSI is developed with the advance of semiconductor technology or relevant technology, functional blocks can be integrated using the technology.

Supplementary Note for the First to Fourth Embodiments

It is to be noted that, although the present invention has been described according to the above-mentioned embodiments, it is apparent that the present invention is not limited to the above-mentioned embodiments. The below cases may also be included in the present invention.

(1) Each device mentioned above is, to be specific, a computer system that includes a microprocessor, a ROM, a RAM, a hard disk unit, a display unit, a keyboard, a mouse, and so on. A computer program is stored on the RAM or the hard disk unit. The microprocessor operates according to the computer program, so that each device achieves its function. Here, the computer program is configured by combining plural instruction codes indicating instructions for a computer in order to implement a predetermined function.

(2) A part or all of the constituent elements included in the respective apparatuses may be configured as an IC card which can be attached and detached from the respective apparatuses or as a stand-alone module. The IC card or the module is a computer system configured from a microprocessor, a ROM, a RAM, and so on. The IC card or the module may also include the aforementioned super-mufti-function LSI. The IC card or the module achieves its function through the microprocessor's operation according to the computer program. The IC card or the module may also be implemented to be tamper-resistant.

(3) The present invention may be a computer program for realizing, by using a computer, the above-described moving picture coding method according to the present invention, and may also be a digital signal including the computer program.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(4) Each of the above-mentioned embodiments may be applied to each of the above-described (1) to (3).

The moving picture coding method according to the present invention is useful as a method that generates a code string by coding each picture included in a moving picture using a video camera, a video recorder, a DVD device, a mobile phone, a personal computer, and so on.

The invention claimed is:

1. A moving picture coding method for coding a moving picture by performing predictive coding with reference to a temporally preceding or following coded picture on a block-by-block basis, said method comprising:

determining a luminance change, in which it is determined whether or not there is a possibility that a luminance change equal to or greater than a predetermined amount has occurred between the coded picture used for the reference and a current picture to be coded including a current block to be coded that is a block on which the predictive coding is performed;

determining a flat region, in which it is determined whether or not a degree of non-uniformity in pixel values of pixels is smaller than a predetermined threshold, the pixels being included in the current block to be coded; and determining a quantization width used for quantization in coding the current block to be coded, wherein, in said determining the quantization width, when it has been determined (i) in said determining the luminance change, that there is the possibility that the luminance change equal to or greater than the predetermined amount has occurred, and (ii) in said determining the flat region, that the degree of non-uniformity is smaller than the predetermined threshold, a quantization width is determined to be a smaller value than a quantization width when it has not been determined: that there is the possibility that the luminance change equal to or greater than the predetermined amount has occurred; or that the degree of non-uniformity is smaller than the predetermined threshold.

2. The moving picture coding method according to claim 1, wherein, in said determining the luminance change, it is determined that there is the possibility that the luminance change equal to or greater than the predetermined amount has occurred, when an amount of change in a value indicated by camera control information obtained from a camera that generates a moving picture to be coded is equal to or greater than a threshold for camera control information.

3. The moving picture coding method according to claim 2, wherein, in said determining the luminance change, at least one of an exposure value, a zoom position, a shutter speed, an aperture value, and a gain value is used as the camera control information.

4. The moving picture coding method according to claim 1, wherein, in said determining the luminance change, it is determined that there is the possibility that the luminance change equal to or greater than the predetermined amount has occurred, when an amount of a picture plane feature value on a picture-by-picture basis is equal to or greater than a threshold of the picture plane feature value, the picture plane feature value being estimated using an inputted image sequence.

5. The moving picture coding method according to claim 4, wherein, in said determining the luminance change, at least one of an amount of change in the picture plane luminance, an estimated zooming speed of the picture plane, and an estimated motion speed of the picture plane is used as the picture plane feature value.

6. The moving picture coding method according to claim 1, wherein, in said determining the luminance change, it is determined that there is the possibility that the luminance change equal to or greater than the predetermined amount has occurred, when a coding structure for the current picture to be coded is a P-picture.

7. The moving picture coding method according to claim 6, wherein, in said determining the luminance change, it is determined that there is the possibility that the luminance change equal to or greater than the predetermined amount has occurred, when the coding structure for the current picture to be coded is the P-picture in field coding, and a field that includes the current block to be coded is a field to be coded ahead in coding order.

8. The moving picture coding method according to claim 7, wherein, in said determining the quantization width, the quantization width of the current block to be coded is determined to be (i) smaller by X than a base quantization width that is a quantization width used as a base, when the coding structure for the current picture to be coded is the P-picture in field coding, and the field that includes the current block to be coded is the field to be coded ahead in the coding order, and (ii) smaller by Y than the base quantization width, when the coding structure is not the P-picture in field coding, or when the field that includes the current block to be coded is not the field to be coded ahead in the coding order, Y being smaller than X.

9. The moving picture coding method according to claim 1, wherein, in said determining the luminance change, it is determined that there is the possibility that the luminance change equal to or greater than the predetermined amount has occurred, when the coding structure for a current picture to be coded is a P-picture or a B-picture.

10. The moving picture coding method according to claim 9,
wherein, in said determining the quantization width, the quantization width of the current block to be coded is determined to be (i) smaller by X than a base quantization width that is a quantization width used as a base, when the coding structure for the current picture to be coded is the P-picture, and (ii) smaller by Y than the base quantization width, when the coding structure is the B-picture, Y being smaller than X.

11. The moving picture coding method according to claim 1,
wherein, in said determining the quantization, width, the quantization width is determined to be a value equal to or smaller than a predetermined quantization width.

12. The moving picture coding method according to claim 1, further comprising
determining a coding structure, in which it is determined whether or not the coding structure for a current picture to be coded is a P-picture,
wherein, in said determining the quantization width, when it has been determined (i) in said determining the luminance change, that there is the possibility that the luminance change equal to or greater than the predetermined amount has occurred, (ii) in said determining the flat region, that the degree of non-uniformity is smaller than the predetermined threshold, and (iii) in said determining the coding structure, that the coding structure for the current picture to be coded is the P-picture, the quantization width is determined to be a smaller value than the quantization width when it has not been determined that: there is the possibility that the luminance change equal to or greater than the predetermined amount has occurred; the degree of non-uniformity is smaller than the predetermined threshold; or the coding structure is the P-picture.

13. A program, embodied in non-transitory computer-readable medium, causing a computer to execute the moving picture coding method according to claim 1.

14. A moving picture coding method for coding a moving picture by performing predictive coding with reference to a temporally preceding or following coded picture on a block-by-block basis, said method comprising:
determining a coding structure, in which whether or not a coding structure for a current picture to be coded is a P-picture, the current picture to be coded including a current block to be coded on which the predictive coding is performed;
determining a flat region, in which it is determined whether or not a degree of non-uniformity in pixel values of pixels is smaller than a predetermined threshold, the pixels being included in the current block to be coded; and
determining a quantization width used for quantization in coding the current block to be coded,
wherein, in said determining the quantization width, when it has been determined (i) in said determining the coding structure, that the coding structure is the P-picture, and (ii) in said determining the flat region, that the degree of non-uniformity is smaller than the predetermined threshold, a quantization width is determined to be a smaller value than a quantization width when it has not been determined: that the coding structure is the P-picture; or that the degree of non-uniformity is smaller than the predetermined threshold.

15. A moving picture coding apparatus which codes a moving picture by performing predictive coding with reference to a temporally preceding or following coded picture on a block-by-block basis, said apparatus comprising:
a luminance change determination unit configured to determine whether or not there is a possibility that a luminance change equal to or greater than a predetermined amount has occurred between the coded picture used for the reference and a current picture to be coded including a current block to be coded that is a block on which the predictive coding is performed;
a flat region determination unit configured to determine whether or not a degree of non-uniformity in pixel values of pixels is smaller than a predetermined threshold, the pixels included in the current block to be coded; and
a quantization width determination unit configured to determine a quantization width used for quantization in coding the current block to be coded,
wherein, said quantization width determination unit is configured to determine, when it has been determined (i) by said luminance change determination unit that there is the possibility that the luminance change equal to or greater than the predetermined amount has occurred, and (ii) by said flat region determination unit that the degree of non-uniformity is smaller than the predetermined threshold, a quantization width to be a smaller value than a quantization width when it has not been determined: that there is the possibility that the luminance change equal to or greater than the predetermined amount has occurred; or that the degree of non-uniformity is smaller than the predetermined threshold.

16. An integrated circuit which codes a moving picture by performing predictive coding with reference to a temporally preceding or following coded picture on a block-by-block basis, said apparatus comprising:
a luminance change determination unit configured to determine whether or not there is a possibility that a luminance change equal to or greater than a predetermined amount has occurred between the coded picture used for the reference and a current picture to be coded including a current block to be coded that is a block on which the predictive coding is performed;
a flat region determination unit configured to determine whether or not a degree of non-uniformity in pixel values of pixels is smaller than a predetermined threshold, the pixels included in the current block to be coded; and
a quantization width determination unit configured to determine a quantization width used for quantization in coding the current block to be coded,
wherein, said quantization width determination unit is configured to determine, when it has been determined (i) by said luminance change determination unit that there is the possibility that the luminance change equal to or greater than the predetermined amount has occurred, and (ii) by said flat region determination unit that the degree of non-uniformity is smaller than the predetermined threshold, a quantization width to be a smaller value than a quantization width when it has not been determined: that there is the possibility that the luminance change equal to or greater than the predetermined amount has occurred; or that the degree of non-uniformity is smaller than the predetermined threshold.

* * * * *